United States Patent [19]
Cann

[11] 3,971,021
[45] July 20, 1976

[54] COHERENT FREQUENCY MEMORY

[75] Inventor: Alfred J. Cann, Wilton, N.H.

[73] Assignee: Sanders Associates, Inc., South Nashua, N.H.

[22] Filed: Apr. 14, 1975

[21] Appl. No.: 567,973

[52] U.S. Cl. .............................. 343/18 E; 328/155; 333/10; 333/31 R
[51] Int. Cl.² .......................................... G01S 7/38
[58] Field of Search ............. 343/18 E; 328/55, 155; 333/10, 31 R

[56] References Cited
UNITED STATES PATENTS

| | | | |
|---|---|---|---|
| 3,044,061 | 7/1962 | Richmond et al. ................. | 343/18 E |
| 3,480,885 | 11/1969 | Schrank ......................... | 333/31 R X |
| 3,806,822 | 4/1974 | Meyer et al. .................... | 328/155 X |

*Primary Examiner*—T.H. Tubbesing
*Attorney, Agent, or Firm*—Louis Etlinger; Robert K. Tendler

[57] ABSTRACT

A single configuration-invariant hybrid phasing circuit is utilized for both phase detection and phase shifting in a quasi-coherent memory to produce an essentially constant amplitude CW signal which is later gated to produce constant amplitude false range pulses. In one mode of operation the subject circuit acts as a phase detector to sense the phase difference between a portion of the received signal and the recirculated signal. In the other mode of operation the subject circuit acts as a phase shifter to phase shift the recirculated signal such that this phase difference is less than 45°. This effectively adjusts the loop delay for the wavelength of the incoming signal. Thus, the subject circuit adjusts the phase of the signals in a recirculation loop of the quasi-coherent memory such that no portion of the CW signal formed during the recirculation is out of phase with any other portion by more than 45°, to thereby limit amplitude variations in the transmitted pulse level with frequency.

10 Claims, 7 Drawing Figures

| RELATIVE PHASE OF FEEDBACK SIGNAL WITH RESPECT TO INPUT SIGNAL | -45° to +45° | 45° to 135° | 135° to 225° | 225° to 315° |
|---|---|---|---|---|
| CONDITION OF INPUTS 1,3 & 4 OF LOGIC CKT, 154 | 3>1; 1>4 | 3>1; 4>1 | 1>3; 4>1 | 1>3; 1>4 |
| OUTPUT AT $C_1, C_2$ | 0,1 | 0,0 | 1,0 | 1,1 |
| OUTPUT LOW AT INDICATED NAND GATE | A | B | C | D |
| SWITCH INDICATED LINE TO TWT | 0° | -90° | 180° | +90° |

COHERENT FREQUENCY MEMORY

FIELD OF THE INVENTION

This invention relates to deceptive jamming of range gated radars and more particularly to a hybrid circuit utilized in a quasi-coherent memory which combines a phase shifting and phase detecting function to produce an essentially constant amplitude CW signal in which the phase between various portions of the signal does not vary by more than 45°.

BACKGROUND OF THE INVENTION

It is common practice in jamming range gated radars to utilize a system which samples the frequency of the incoming pulse from an "enemy" radar and generates a pulsed signal having this frequency. This signal is then transmitted back to the "enemy" radar such that the inter-pulse spacings are gradually varied to deceive the radar as to the range of the target. One such system for accomplishing this is a system which utilizes the incoming pulse, amplifies it, delays it, and couples it back into the transmission line. The delay is produced by a delay circuit which is in a feedback loop and the delay is set such that the leading edge of the delayed signal meets the trailing edge of the preceding signal such that an essentially continuous CW signal is available at the output of the recirculating memory. This signal is then gated in an appropriate manner to provide the output pulses which convey false range information.

The system is exceedingly simple in that it reproduces a signal having the same frequency as that of the incoming pulse over a wide range of input pulse frequencies. However, one of the problems with this system is that the output signal amplitude fluctuates with the frequency of the incoming signal. This results because in the production of the CW signal the delay normally used is fixed. With a fixed delay, the effective recirculation loop length may not be a whole number of wavelengths of the particular input signal which arrives at the jammer, and there may be a phase shift between the leading edge of the delayed pulse and the trailing edge of the preceding pulse as recirculation occurs. If, for instance, a 180° phase reversal occurs it is theoretically possible that one portion of the signal from the quasi-coherent memory will cancel another portion. Thus, the amplitude of the output signal from the quasi-coherent memory can theoretically go to zero. In actual practice, however, this exact phase relationship rarely, if ever, occurs. However, significant amplitude decreases do, in fact, occur at regular frequency intervals absent any adjustments of the effective length of the recirculation loop with input signal frequency.

Thus, the problem with prior art jammers utilizing recirculating memories is that in order to compensate for these reduced power problems, the jamming transmitter must have an inordinately high power rating.

One method of reducing amplitude fluctuation described in copending application Ser. No. 264,123, filed June 19, 1972 by Victor Trush and assigned to the assignee hereof is to phase shift the delayed signal to effectively lengthen or shorten the recirculation loop such that the phase difference between the signal at the leading edge of the delayed pulse and the signal at the trailing edge of the preceding pulse is reduced to no more than 45°. This effectively adjusts the length of the recirculation loop to approximate a whole number of wavelengths of the incoming signal. The Trush apparatus accomplishes this by gating the incoming pulse through a "quasi-coherent" memory circuit which has an adjustable delay loop to recirculate the incoming pulse. The phase difference between the input signal and the delayed signal is then sensed and a predetermined phase shift is introduced into the recirculation loop to effectively lengthen or shorten the loop. After the required phase shift is inserted into the feedback loop, signals are recirculated to produce a CW signal of substantially constant amplitude. This CW signal is then applied to an amplifier such as a traveling wave tube (TWT) which is modulated in accordance with the variable inter-pulse spacing desired for deceptive range gate jamming. It will be appreciated that the system thus far described requires both a phase shifter and a phase detector as separate circuits.

It is the purpose of the subject invention to provide a single configuration invariant phasing network which functions both as phase detector and phase shifter. For purposes of the subject invention the term "configuration invariant" means that no changes are made to the circuit to switch it from its phase detecting mode to its phase shifting mode. Additionally, with the use of this circuit the switching system for providing the required phase shift is moved from its initial position between the aforementioned phase shifter and phase detector to a position between the hybrid phasing network and the TWT amplifier utilized in the quasi-coherent memory. In this hybrid system the input signal is applied to the phasing network which, in one embodiment, has four output terminals and four associated output lines coupled to a four position switch. Signals on these lines are phase shifted by 0°, 90°, 180° or −90° with respect to a feedback signal coupled back to the phasing network. Initially one of the lines is coupled through the four position switch to a traveling wave tube (TWT) amplifier to introduce the input pulse into the loop. It does not matter which line is chosen. A portion of the output signal from this amplifier is tapped off, delayed and fed back to a feedback input terminal of the phasing network. This feedback signal is mixed with the input signal such that the amplitudes of the signals on the four output lines are related to the phase difference between the feedback signal and the input signal. At this point the phasing network acts as a phase detector such that the relative amplitudes of the signals on the four output lines indicate the phase difference between the feedback signal and the input signal. These signals are rectified and the corresponding d.c. voltages are sensed at a logic circuit which then controls the four position switch to switch that line to the TWT which results in the feedback signal being in phase (or closest to being in phase) with the input signal. This effectively adjusts the length of the recirculation loop for the wavelength of the incoming signal.

The way this is determined is as follows: assume the feedback signal is found to be between 45° and 135° out of phase with the input signal, the four position switch switches the line which shifts the feedback signal by −90° to the TWT. Thus the phase difference between the input and feedback signals is reduced to less than 45°. This in effect adjusts the delay of the recirculation loop to the frequency of the incoming signal so that that which is recirculated will be in phase, or close to being in phase, with that portion of the signal which is amplified by the traveling wave tube. After the switch is set (after phase detection) the phasing network acts solely as a phase shifter, with the switch staying in the position set by the logic until the next input pulse arrives. Thus, after the first recirculation (the recirculation of a portion of the input pulse) the logic is inhibited and stays inhibited until the arrival of another input pulse is sensed. The hybrid phasing network thus performs first the function of a phase detector, and then the function of a phase shifter.

In this manner the output from the quasi-coherent memory is a wave train in which one portion of the wave does not vary in phase from another portion of the wave train by more than 45°. It is therefore impossible for a large phase shift to occur in the output signal from the quasi-coherent memory and this memory therefore has a relatively flat amplitude response.

An additional advantage of combining the aforementioned phase shifting network and the aforementioned phase detecting network is a decreased loop loss by using one circuit performing the function of two circuits. Moreover, size and weight savings are realized by the single subject network. Additionally, since the jammer may be exposed to pulse trains from multiple radars simultaneously, there is an advantage in maintaining the high speed operation of the quasi-coherent memory with a short cycle time so that the subject jammer will be able to accommodate multiple incoming radar pulse trains. It will be appreciated that with each incoming pulse, the four position switch is set so that the phase error is minimized. The system can therefore accommodate a pulse from a first pulse train, set the switch, and transmit a return pulse with the prescribed delay and then accomodate an incoming pulse from a second incoming pulse train. The resetting of the quasi-coherent memory and the gating of the incoming pulses to the quasi-coherent memory is controlled by a conventional logic circuit and threshold detector such that the quasi-coherent memory can be made to operate on each distinct incoming pulse.

It is therefore an object of this invention to provide an improved jamming system operative against range gated radars.

It is another object of this invention to provide a single phasing network which accomplishes both a phase shifting and phase detection function.

It is a further object of this invention to provide an improved frequency memory in which output amplitude fluctuations are minimized.

It is yet another object of this invention to provide a memory for producing an essentially constant amplitude CW signal which has the same frequency as an incoming signal in which the memory employs a recirculation system utilizing a single phasing network which insures that any given portion of the CW signal varies by no more than 45° in phase from any other portion of the CW signal.

It is a yet still further object of this invention to provide an improved phasing network and four position switch combination for use in a quasi-coherent memory in which information is tapped from the output lines of the phasing network to instruct a logic circuit to control the position of the four position switch thereby to inject the appropriate phase shift into the recirculation loop of the quasi-coherent memory.

These and other objects of this invention will be better understood in connection with the following description in view of the appended drawings in which:

Detailed Description

Figure 1:
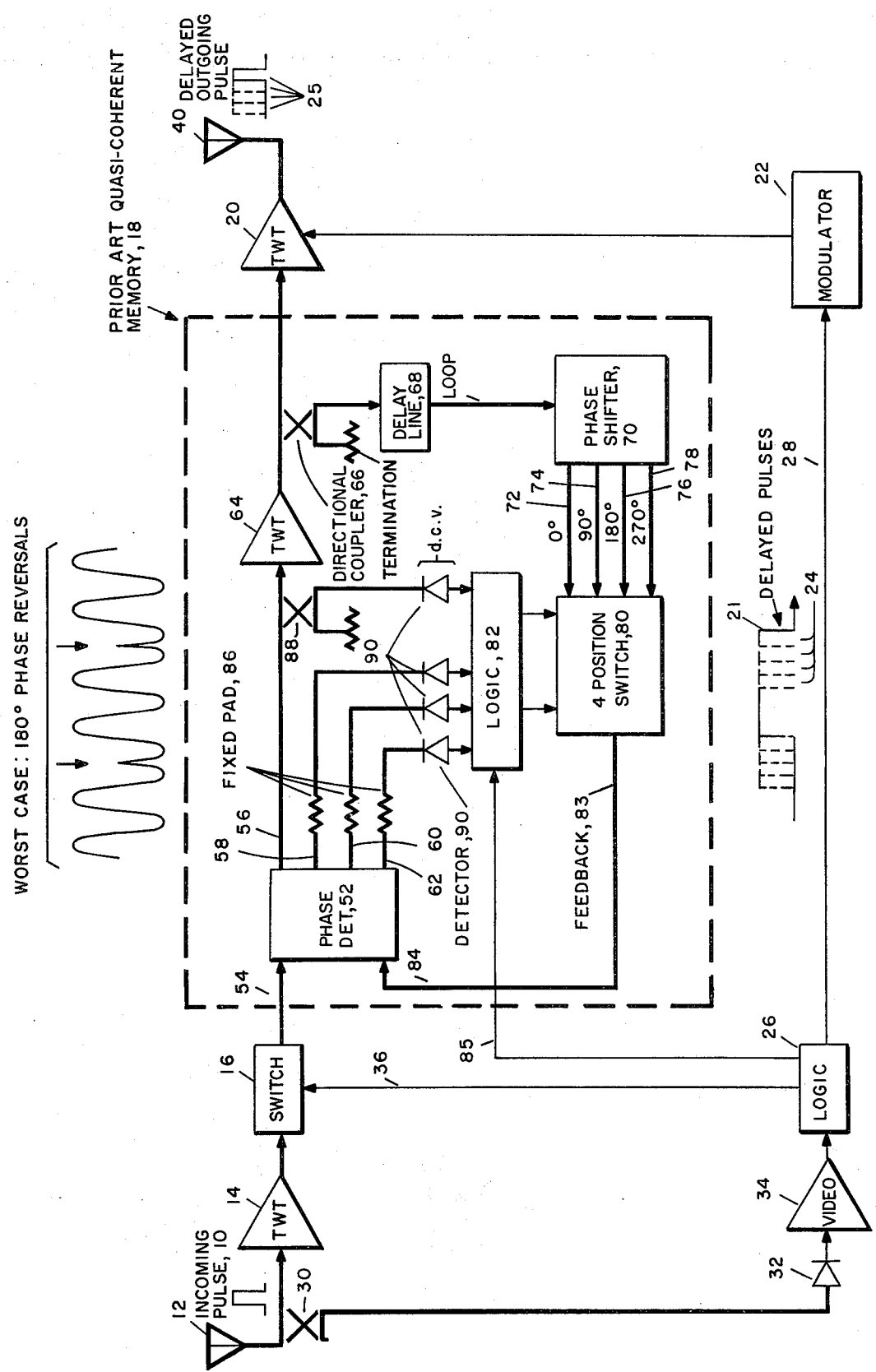
FIG. 1 is a block diagram of a prior art jamming system utilizing a recirculating memory.

Referring now to FIG. 1, a prior art deceptive jamming system, typically located at a potential radar "target" for producing deceptive jamming pulses, is illustrated in which an incoming r.f. pulse 10 at antenna 12 is coupled to a traveling wave tube amplifier 14 where it is amplified and gated by switch 16 to the input of a recirculating memory circuit 18. It is the function of the recirculating memory circuit to amplify, delay and recirculate this pulse such that the leading edge of the delayed pulse coincides in time with the trailing edge of the incoming pulse. This creates a pulse which is again delayed such that the further delayed pulse meets with the trailing edge of the previous delayed pulse. As the recirculation continues the output of the recirculating memory contains an essentially CW signal having the same frequency as the incoming pulse. The output of the recirculating memory circuit 18 is coupled to a second traveling wave tube amplifier 20 which is gated by a modulator 22 in accordance with the leading edge 21 of a pulse from a logic circuit 26 which operates upon detection of an incoming pulse to produce a series of pulses 24 along line 28, in which succeeding pulses are delayed by varying amounts to enable production of deceptive range gate pulses illustrated at 25.

Logic circuit 26 operates on a signal tapped from the transmission line between antenna 12 and the traveling wave tube 14 via coupler 30. The output from coupler 30 is coupled to a detector 32 and the signal therefrom is provided to the input terminal of a video amplifier 34. The output of the video amplifier is a video voltage proportional to the amplitude of the incoming pulse. When the amplitude of the signal from video amplifier 34 reaches a predetermined threshold as determined by thresholding circuits within logic 26, logic circuit 26 opens switch 16 for a predetermined time interval so that a portion of the incoming signal is transmitted to the recirculating memory circuit 18. This is accomplished by a command signal from logic 26 over line 36 to switch 16.

After logic 26 determines that an incoming pulse has arrived which exceeds the predetermined amplitude, logic circuit 26 produces a series of pulses 24 which are successively delayed so that modulator 22 gates amplifier 20 on and off a corresponding number of times to produce successive pulses, with either gradually increasing or decreasing inter-pulse spacings. This results in the production of pulses indicative of ranges differing from the actual range of the "target".

In order to transmit these pulses, the output of traveling wave tube amplifier 20 is coupled to a transmitting antenna 40 such that a pulse train is transmitted having the same frequency as the incoming pulse and having an inter-pulse spacing which gradually varies to provide false range information at the "enemy" radar.

In the prior art, the recirculating memory circuit included a traveling wave tube amplifier and a fixed length delay loop. The delay was set for a given center frequency to control the recirculation time such that the leading edge of the pulse from the output of the delay circuit met the trailing edge of the sampled pulse delivered to the traveling wave tube amplifier. When the loop delay was an exact multiple of the wavelength of the incoming signal, with a number of recirculations, an essentially CW signal resulted at the output of the traveling tube which was then gated to provide jamming pulses.

However, if the length of the recirculating memory is not a whole number of wavelengths of the incoming signal there can be a large phase shift between the leading edge of the pulse from the delay circuit and the trailing edge of the preceding pulse. With the earliest of the prior art memories in which fixed delay loops were used, as illustrated at the top of FIG. 1, in the worst case for a given frequency $f_0$, a portion of the output signal from the memory may have one phase, with another portion of the signal being 180° out of phase with this first portion. This resulted in phase cancellation and consequent reduction of signal amplitude. Thus, it was theoretically possible that the effective amplitude of the output of the memory would go to zero with this type of phase cancellation. While this worst case situation almost never occurs in practice, sufficient phase dislocations occurred such that the output power from the memory took significant dips at regularly recurring frequency intervals. Thus, rather than a constant amplitude CW signal from the recirculating memory, rapid and severe amplitude fluctuations occurred for certain frequencies.

To remedy this situation, in the past it was the practice to provide a great deal of amplification of the signal from the recirculating memory such that minimum acceptable output power was achieved for all frequencies of interest. This, however, required the use of more, or larger, traveling wave tube amplifiers.

THE QUASI-COHERENT MEMORY

To solve this problem, quasi-coherent memories such as the Trush memory, were developed. Referring again to FIG. 1 the Trush quasi-coherent memory typically takes on the configuration illustrated within dotted box 18. This memory configuration insures that the phase difference between the incoming signal and the recirculated signal is no more than 45° to prevent 180° phase reversals and to reduce the traveling wave tube amplification required to achieve acceptable jamming.

A brief explanation of the quasi-coherent memory is now presented to aid in the understanding of the subject invention which is an improvement thereon. The quasi-coherent memory, in one embodiment, includes a phase detector 52 which has an input terminal 54 and output terminals 56, 58, 60 and 62. The phase detector operates such that the amplitude of the signals at the respective output terminals reflects the relative phase between the input signal and a recirculated feedback signal applied to the phase detector.

Figure 2:
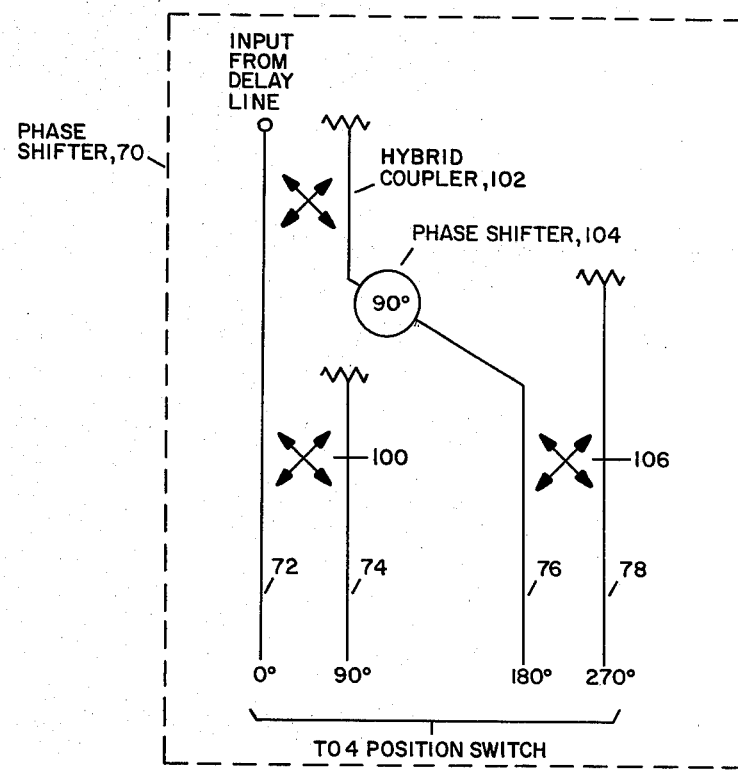
FIG. 2 is a network diagram illustrating the circuit of the phase shifter of FIG. 1.

Output 56 of phase detector 52 is coupled directly to the input terminal of a traveling wave tube amplifier 64, the output of which is utilized to develop the aforementioned CW signal. A directional coupler 66 of conventional design taps off a portion of the signal from the output of amplifier 64 and couples it to the input terminal of a conventional microwave delay line 68 such as that illustrated at reference character 60 of FIG. 2 of U.S. Pat. No. 3,218,561 issued to D. E. Moeller on Nov. 16, 1965 and assigned to the assignee hereof. The output of the delay line is coupled to a phase shifter 70 which phase shifts the signal from the delay line by 0°, 90°, 180° and 270° at four separate outputs 72, 74, 76 and 78 respectively. These outputs are coupled to a four position switch 80 which couples one of the four phase shifted signals via feedback line 83 to another input terminal 84 of phase detector 52.

Four position switch 80 is under control of logic circuit 82 which operates on d.c. voltages derived from fixed pads 86 and is coupled to outputs 58, 60 and 62 of phase detector 52. The fourth input to logic circuit 82 is from output 56 via directional coupler 88. The d.c. signals for logic circuit 82 are derived from rectifying detectors 90 as illustrated.

In operation, the relative phase between the incoming signal and the feedback signal on line 83 is detected. Upon ascertaining the phase difference between the feedback signal and the input signal, switch 80 is positioned to switch that output of phase shifter 70 which provides that the feedback signal is no more than 45° out of phase with the input signal. This effectively adjusts the loop delay and thus the effective length of the recirculation loop to the wavelength of the incoming signal. After receipt of an input pulse and the positioning of switch 80, logic 82 is inhibited via a signal over line 85 until the arrival of the next pulse.

It will be appreciated that in this system separate units are utilized for phase detection and the phase shifting. In one embodiment, the phase detector and the phase shifter may take on the configurations illustrated in FIGS. 2 and 3. With respect to the phase shifter shown in FIG. 2, this unit is a truncated four element Butler matrix in which the signal from the delay line is available at the output of the phase shifter without any phase shifting whatsoever as illustrated by the 0° phase notation. A 90° phase shift is accomplished by a conventional hybrid coupler 100 such that the output from this coupler is 90° phase shifted with respect to the signal from the delay line. A 180° phase shift is accomplished with a second conventional hybrid coupler 102 which phase shifts the signal from the delay line by 90°. A conventional 90° phase shifter 104 is then employed such that an output 180° phase shifted from the input is available as an output of the phase shifter. A third conventional hybrid coupler 106 is utilized to phase shift the 180° phase-shifted signal by another 90° to provide the 270° phase shift required. It will be appreciated the entire network can conveniently be made in one package.

Figure 3:
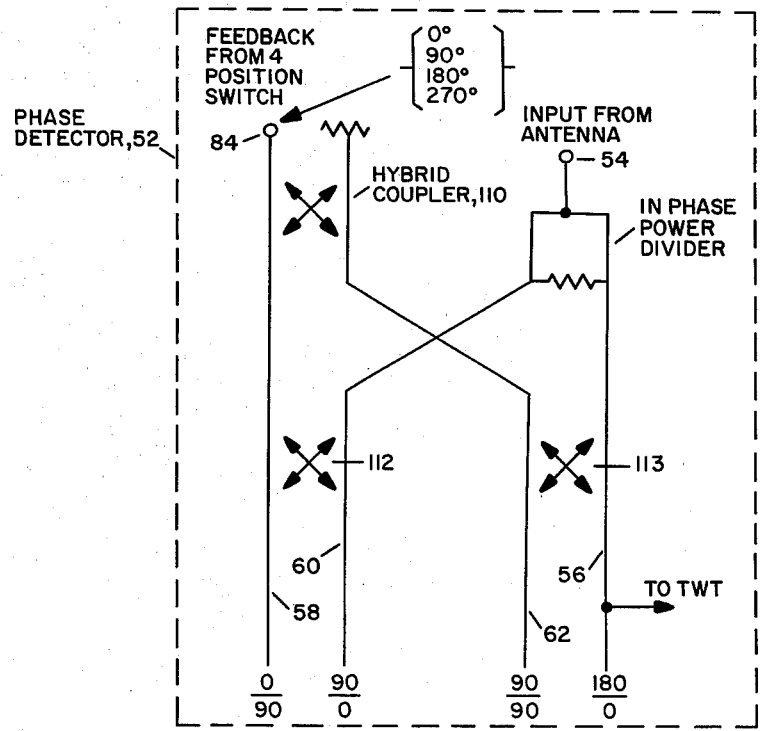
FIG. 3 is a network diagram illustrating the network utilized in the phase detector of FIG. 1.

Referring to FIG. 3 the microwave circuit diagram illustrates a prior art circuit which is used for the phase detector 52 of FIG. 1. This circuit includes hybrid couplers 110, 112 and 113 which generate the aforementioned 90° phase shift between an input terminal to the coupler and its output terminal.

The relative phase difference between an input from the antenna at terminal 54 and an input from the feedback circuit at terminal 84 is derived as follows as a function of the relative voltages at the output terminals of the phase detector: the feedback signal is coupled to input terminal 84 of the phase detector and is transmitted directly to output terminal 58. Along this transmission path the feedback signal is mixed at coupler 112 with a 90° phase shifted version of the input signal applied to input terminal 54. This relationship is indicated by the notation 0/90 and the amplitude at output terminal 58 will be maximum for a relative phase difference of −90°. With respect to output terminal 60, the feedback signal at terminal 84 is phase shifted 90° while the input signal at terminal 54 is unshifted resulting in a relation 90/0. A maximum in the amplitude of the signals at output terminal 60 thus occurs for a relative phase difference of +90°. With respect to output terminal 62, the feedback signal at terminal 84 is shifted 90° via hybrid coupler 110 and the input signal at terminal 54 is shifted 90° by hybrid coupler 113 for a relation of 90/90. A maximum in the amplitude of the signals at output terminal 62 thus occurs for a relative phase difference of 0°. Finally, the signal at output terminal 56 is composed of the feedback signal at terminal 84 twice shifted by 90° via couplers 110 and 113 and an unshifted input signal from terminal 54. This results in a relation 180/0, and a maximum at output terminal 56 for a relative phase difference of 180°. These relations determine the relative amplitudes of the output voltages for any given phase difference between input and feedback signals. It can be shown that an inphase condition, for example, may be represented by d.c. voltages of 1.4 volts, 1.4 volts, 2 volts, and 0 volts at selected outputs of the rectifying detectors. Other voltage combinations indicate other relative phase differences between the feedback and input signals. It is the function of the logic circuit to sense the relationship between the d.c. voltages and appropriately position the four position switch.

It will be appreciated that the phase of the signal at output terminal 56 may be changed merely by switching the appropriately phase shifted signal from phase shifter 70 of FIG. 1 to feedback input terminal 84. This switching is controlled by logic circuit 82 of FIG. 1 from information derived from the four output terminals of the phase detector 52.

COMBINED PHASE DETECTOR AND PHASE SHIFTER

It is a finding of the subject invention that the phase detector and the phase shifter may, in fact, be combined into one stripline circuit in a slightly different type of system to effect not only cost savings but also to reduce loop loses and therefore permit lower gain amplifiers or higher loss delay lines.

Figure 4:
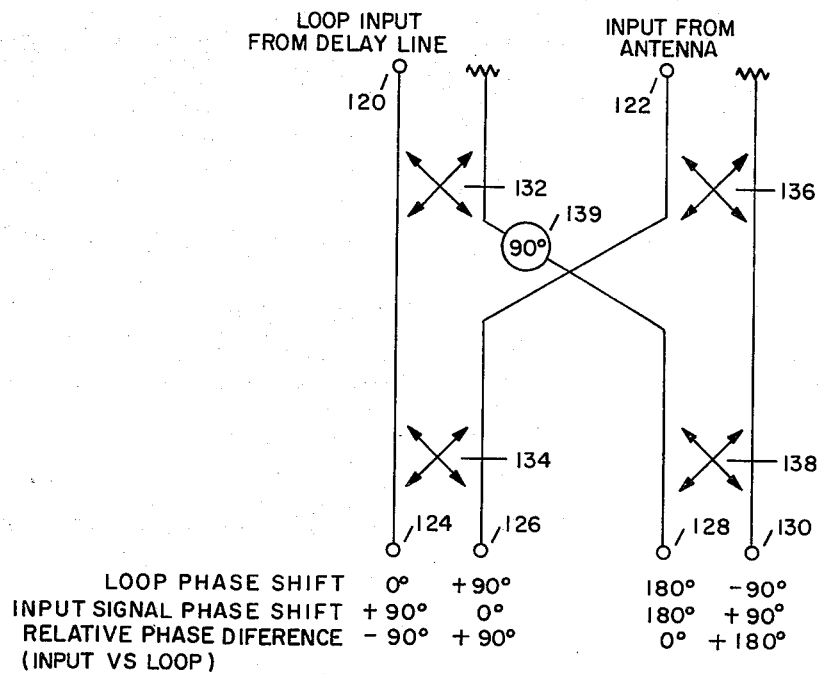
FIG. 4 is a diagram of a phasing network which duplicates the functions of the networks of FIG. 2 and FIG. 3 to produce at the output thereof phase shifts of 0°, +90+, +180°, and −90° with respect to the phase of the feedback signal to the phasing network.

Referring now to FIG. 4, a phasing network which accomplishes both of the aforementioned functions is illustrated. This network includes a feedback terminal 120 and an input terminal 122 to which the gated input signal from the antenna is applied. This circuit also has four output terminals 124, 126, 128 and 130 at which are available signals which are phase shifted respectively +90°, 0°, 180° and +90° with respect to the input signal and +0°, +90°, 180° and −90° with respect to the feedback signal. It will be appreciated that no alteration of a signal is defined as a phase shift of 0° for purposes of the subject invention. Also, a shift of 0° is considered a phase shift of a discrete amount, e.g. "0". The relative phase differences at the outputs are respectively −90°, +90°, 0°, and 180°. In this phasing network there are four conventional hybrid couplers 132, 134, 136 and 138, each of which functions as a 90° phase shifter between adjacent lines. Also provided is a conventional 90° phase shifter 139 to institute a 90° phase shift in a single line.

Figure 5:
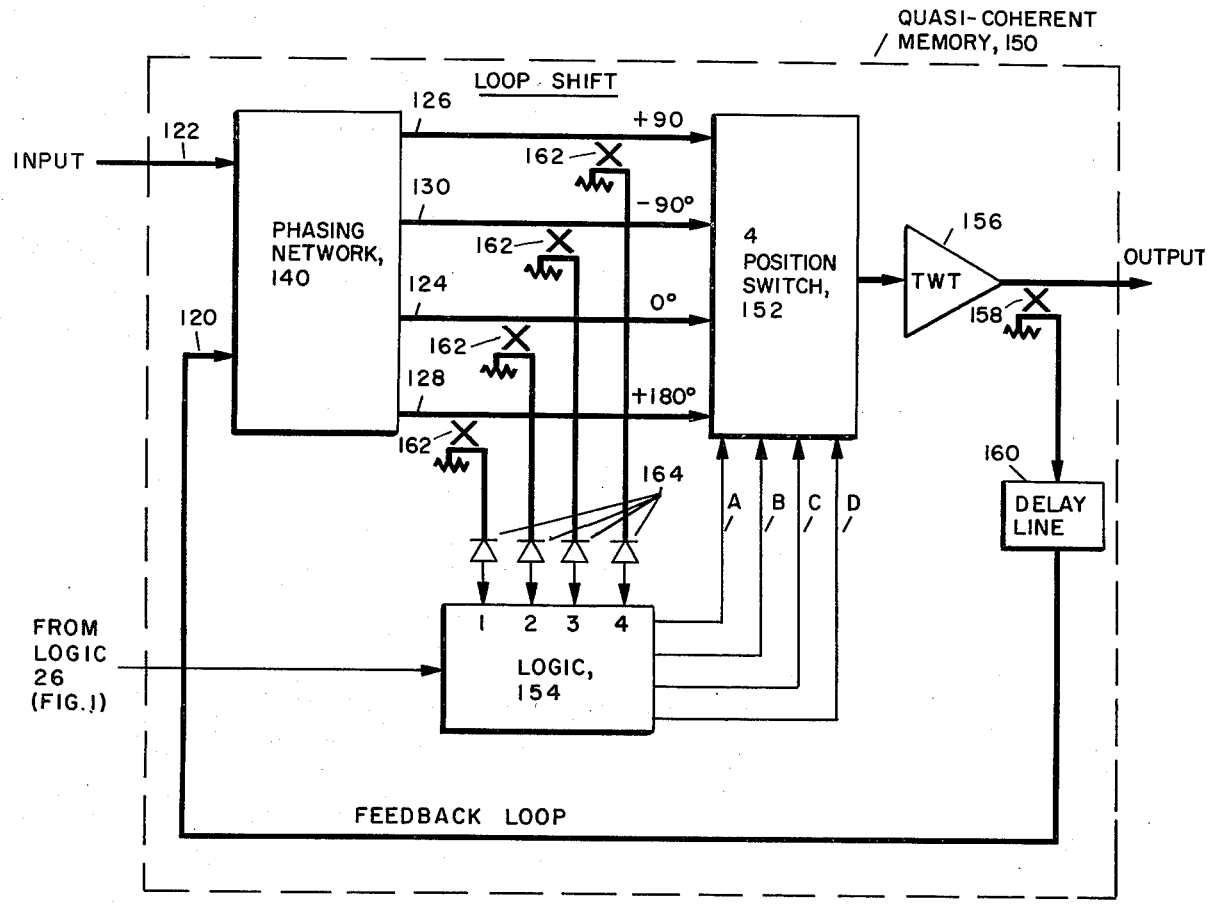
FIG. 5 is a block diagram illustrating the system which utilizes the phasing network of FIG. 4 as part of a quasi-coherent memory.

Referring to FIG. 5, this phasing network is incorporated into a modified quasi-coherent memory 150 with the input and output terminals of the phasing network illustrated by the same reference characters as those used in FIG. 4. The output terminals of the phasing network are coupled to a four position switch 152 which is under control of a logic circuit 154. This switch may be a conventional four position microwave diode switch. The output of the four position switch is coupled to a traveling wave tube amplifier 156, the output of which is utilized in forming the transmitted signal. A conventional coupler 158 taps a portion of the output signal from amplifier 156 and applies it to a conventional delay line 160 which delays the signal and feeds it back to input terminal 120 of the phasing network. In this system, signals are tapped from the four outputs of the phasing network via couplers 162. The tapped signals are rectified by detectors 164 and are applied to logic circuit 154. For purposes of explanation the d.c. signal derived from the output signal at terminal 128 is designated No. 1; the d.c. signal derived from the signal at terminal 124 is designated No. 2; the d.c. signal derived from the signal at terminal 130 is designated No. 3; and the d.c. signal derived from the signal at terminal 126 is designated No. 4. Moreover, the outputs from logic circuit 154 are labeled A, B, C and D respectively. The purpose of this nomenclature will become clear in the description of the logic circuit in FIGS. 6 and 7 and hereinafter.

In operation, initially a received pulse is gated to the phasing network. This signal appears at all output terminals 124, 126, 128 and 130 of the phasing network shifted respectively 90°, 0°, 180° and 90°. Four position switch 152 is initially set to couple the input pulse from one of the output terminals of the phasing network to TWT 156. It will be appreciated that it does not matter which of the output terminals of the phasing network is initially selected by the switch. The output of the TWT is tapped at 158 and is applied to the input of delay line 160. With the input signal present and the feedback signal from the first recirculation now available, the phasing network operates as a phase detector, such that the phase difference between the feedback and input signals is indicated by the relative voltages at the output terminals. To accomplish this the signal at the output of the delay line now available at input 120 is mixed via the subject network with an input signal at terminal 122 which has been phase shifted 90° to yield a relation 0/90 at terminal 124. Thus, a maximum in amplitude occurs at output terminal 124 with a relative phase of −90° between input and feedback signals. A maximum amplitude representing a +90° relative phase is available at output terminal 126 and is derived from a 90° phase shifted input signal from terminal 120 and an unshifted signal from terminal 122. A maximum amplitude representing a 0° relative phase is available at terminal 128 and is derived from the delay line signal at input terminal 122 shifted 90° by hybrid coupler 132 and another 90° by conventional phase shifter 139 mixed with a signal from terminal 122 shifted 180° by two hybrids. A maximum amplitude representing a 180° relative phase is available at output terminal 130 and is derived from delay line input signal at terminal 122 shifted 90° by hybrid coupler 136 and a 270° shifted signal from terminal 120. The circuit illustrated in FIG. 4 may be easily implemented in stripline form in a conventional manner. As can be seen, the relative phase differences are manifest as differing amplitudes at the different output terminals such that when the signals at these output terminals are rectified, the amplitudes of the resulting d.c. voltages indicate the phase difference between the input and feedback signals.

Absent the input signal at terminal 122, the phasing network operates as a phase shifter to shift the phase of the signals in the feedback loop by 0°, 90°, 180° and −90° at terminals 124, 126, 128 and 130 respectively.

In the general operation of the system of FIG. 5, the input signal is phase shifted by the phasing network and four components are coupled to the four position switch 152 which is initially set in one embodiment to couple output terminal 126 to the traveling tube amplifier 156. The switch is set by logic circuit 154 upon the sensing of an incoming pulse and then the logic circuit is inhibited for a length of time to allow the incoming pulse to be coupled to the delay line. It will be appreciated that with no signal on terminal 120 the signal on terminal 122 will pass through the phasing network 140 unshifted at output terminal 126. This unshifted signal is amplified by amplifier 156 and delayed by delay line 160 from whence it is applied to input terminal 120 of the phasing network. At this point the phasing network compares the phase of the signal at terminal 120 with a portion of the incoming signal at input terminal 122. Thereafter, signals indicative of the phase difference of the signals at input terminals 120 and 122 will appear at output terminals 124–130. Logic circuit 154 is then released so that it can respond to the various d.c. levels at its inputs No. 1, No. 2, No. 3, and No. 4. The logic circuit then functions to position the four position switch such that the line with the appropriate phase shift (when the phasing network is acting as a pure phase shifter) is switched to the traveling wave tube amplifier 156. The appropriate phase shift is defined to be that phase shift which results in the phase difference between the recirculated signal and the input signal being less than 45°. After switch 152 has been positioned the input signal to the phasing network is interrupted so that the phasing network acts solely as a phase shifter. Thereafter, the four position switch is frozen in the designated position until such time as another input pulse is present at the receiving antenna at which time the switch is reset to its initial position. This may be accomplished with a control signal from logic 26 of FIG. 1 to logic 154 of FIG. 5.

The quasi-coherent memory thus produces an output signal the amplitude of which will not fluctuate significantly with input signal frequency because the recirculation path length is effectively adjusted for the wavelength of the incoming signal.

The quasi-coherent memory therefore operates in response to the receipt of a radar pulse to produce a constant amplitude CW signal sufficiently long to be able to generate a return pulse which will effectively give the "enemy" radar false ranging information. The entire system is reset for a second received pulse which may or may not be of the same frequency as the first pulse. The quasi-coherent memory circuit has a broadband response to accommodate a wide variety of incoming pulse frequencies. Moreover, if multiple "enemy" radars are tracking a "target", assuming that the pulses arrive from the two "enemy" radars with enough inter-pulse spacing, the subject system will respond and retransmit false ranging pulses back to each "enemy" radar.

In summary, the four position switch is initially set to pass the input signal and then positioned to minimize the phase difference between the input signal and the feedback signal. Thereafter, the four position switch is reset to its initial position upon the arrival of the next incoming pulse. All of this takes place in timed relationship to the actuation of the modulator downstream so that the appropriate false ranging information may be transmitted.

Figures 6, 7:
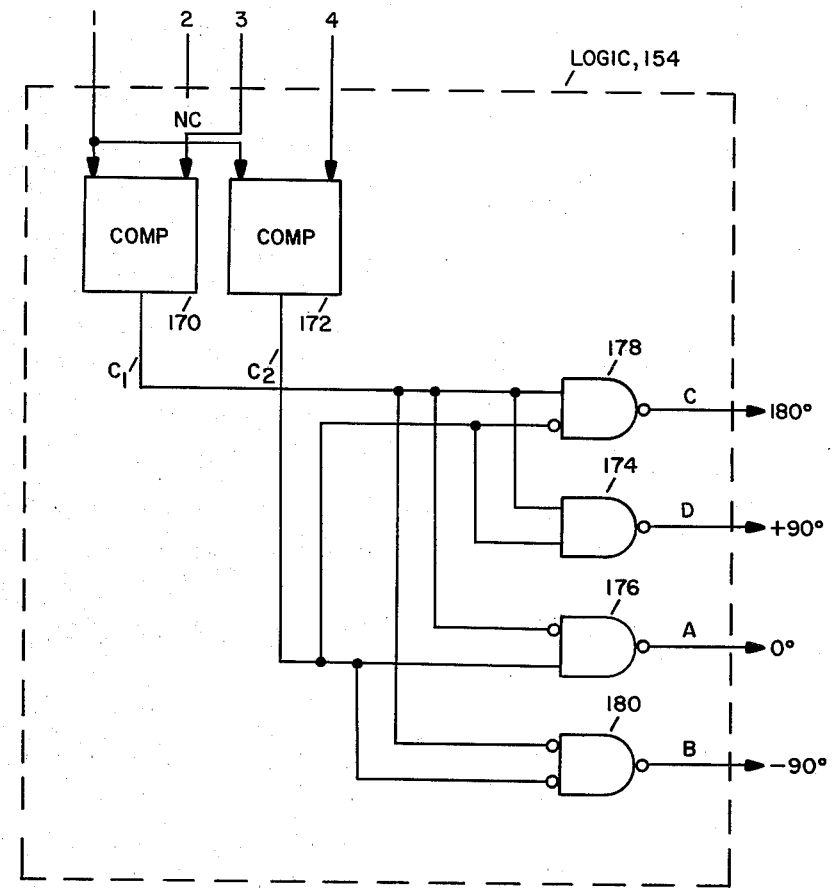
FIG. 6 is a block diagram of the logic circuit of FIG. 5.
FIG. 7 is a table describing the operation of the logic circuit of FIG. 6 with respect to the relative phase between the feedback signal of the circuit of FIG. 5 and the input signal.

One simple logic circuit which may be utilized for the decoding portion of logic 154 of FIG. 5 is illustrated in the dotted box of FIG. 6. This is the portion of the logic which determines the relative phase difference between the input signals to the phasing network and selects a position for the four position switch. The phasing network is set up such that the shift switched into the feedback loop is 0°, 90°, 180° or 270°.

In order to reduce phase error to no more than 45°, the logic is arranged so that it senses phase errors in the ranges −45° to +45°, +45° to 135°, 135° to 225°, and 225° to 315°. For each range, the logic output selects that switch position which would shift the feedback loop signal by that amount necessary to reduce the phase difference to zero (correct perfectly) for a phase error in the center of the range. Therefore any residual phase error remaining after the switch has been set will be less than 45°.

This logic circuit in one embodiment includes comparators 170 and 172 having outputs respectively, C1 and C2. The outputs of these comparators are coupled as illustrated to gates 174, 176, 178 and 180. These gates are NAND gates with selected gates having inverting input terminals as shown.

As illustrated by the table in FIG. 7, the logic circuit works as follows. Note that in this logic configuration the No. 2 input is not necessary and is not connected (NC). If the relative phase of the feedback signal and the input signal is between −45° and +45° the d.c. level of the signal at input No. 1 will be less than that at input No. 3 and greater than that at input No. 4. The outputs of the comparator C1, C2 will be respectively at a logic level "0" and logic level "1". This will result in a logic level "0" output signal at NAND gate 176 herein labeled "A". A logic level "0" signal at this NAND gate causes the switch to couple the output terminal associated with a 0° phase shift (terminal 124) to the traveling wave tube amplifier, since the relative phase difference between the input and feedback signal is less than 45° by definition of the range. For phase differences of between 45° and 135° the d.c. level of the signal at input No. 1 will be less than at input No. 3, and less than that at input No. 4. The outputs C1 and C2 will both be at logic level "0" and a logic level "0" signal will appear at the output of NAND gate 180, labeled "B". This logic level "0" signal will position the switch such that the output terminal carrying the −90° phase shifted signal (terminal 130) will be coupled to the traveling wave tube amplifier thus restoring the phase difference between the input signal and the feedback signal to less than 45°. For phase differences of 135° to 225° the d.c. level of the signal at input No. 1 will be greater than that at input No. 3 and less than that at input No. 4, resulting in outputs C1 and C2 equal to logic levels "1" and "0" respectively. This results in a logic level "0" output to NAND gate 178, labeled "C", thereby commanding the switch to connect the +180° phase shift terminal (terminal 128) to the traveling wave tube amplifier. Finally, if the phase difference is between 225° and 315° (−45°) the d.c. level of the signal at input No. 1 will be greater than that at input No. 3 and that at input No. 4, such that the outputs at C1 and C2 will be logic level "1", "1" respectively which results in a logic level "0" output at NAND gate 174, labeled "D", such that the switch will couple the +90° terminal (terminal 126) to the traveling wave tube amplifier thereby again keeping the phase difference less than 45° between the input and the feedback signals.

What has therefore been provided is an improved, simplified quasi-coherent memory which eliminates the necessity for two separate stripline units. The invention generally involves a configuration invariant network having two input terminals and a number of output terminals with means for providing signals representing the phase difference between the input signals at the output terminals, and absent one of the input signals, for providing the other input signal shifted by predetermined amounts at the output terminals by the same network. Thus, finer approximations can be achieved with larger numbers of output terminals and appropriate logic. It will be appreciated that other modifications are within the scope of this invention and that this invention is not limited to the particular type of circuits described. In addition to the system as a whole, this invention provides a simple single network for combining phase shifting and phase detecting functions which may be utilized elsewhere as well as being utilized in the subject quasi-coherent memory.

Although a specific embodiment to the invention has been described in considerable detail for illustrative purposes, many modifications will occur to those skilled in the art. It is therefore desired that the protection afforded by Letters Patent be limited only by the true scope of the appended claims.

I claim:

1. A configuration invariant network for providing phase detecting and phase shifting functions alternatively comprising:
   first and second input terminals;
   a number of output terminals; and
   means for providing at said output terminals signals representing the phase difference between signals at said first and second input terminals, and absent any signal at said first terminal, for providing at said output terminals the signal at said second input terminal phase shifted by predetermined fixed amounts.

2. The network of claim 1 wherein said number of output terminals is four and wherein the signal at said second input terminal is shifted by four discrete amounts.

3. A phasing network comprising:
   first and second input terminals;
   first, second, third and fourth output terminals;
   a first conductor between said first input terminal and said first output terminal;
   a second conductor between said second input terminal and said second output terminal;
   means for coupling signals from said first conductor to said second conductor with a predetermined phase shift and vice versa;
   a third conductor terminated at one end and connected to said third output terminal at the other end thereof;
   means interposed in said third conductor for phase shifting signals carried thereon by a predetermined phase shift;
   means for coupling signals from said first conductor to said third conductor with a predetermined phase shift;
   a fourth conductor terminated at one end and connected to said fourth output terminal at the other end thereof;
   means for coupling signals from said second conductor to said fourth conductor with a predetermined phase shift; and
   means for coupling signals from said third conductor to said fourth conductor with a predetermined phase shift and vice versa.

4. The phasing network of claim 3 wherein all of said predetermined phase shifts are the same.

5. The phasing network of claim 4 wherein all of said predetermined phase shifts are 90°.

6. A quasi-coherent memory for use in a deceptive jamming system in which an incoming pulse is gated to the memory upon detection and wherein a reset signal is generated upon detection of an incoming signal, comprising:
   a two input terminal, four output terminal phasing network for providing at each of its four output terminals a signal having an amplitude related to the phase difference between signals at its two input terminals and for providing at its four output terminals the signal at one of its input terminals, respectively shifted by four different amounts;
   means for coupling said gated input signal to said one input terminal;
   an amplifier;
   means for initially switching one of said output terminals to the input of said amplifier responsive to said reset signal;
   means for coupling the output of said amplifier with a fixed delay to the other of the input terminals of said phasing network;
   means for providing four separate d.c. voltages corresponding respectively to the amplitudes of the signals at said four output terminals; and
   means responsive to the amplitudes of said d.c. signals for switching to said amplifier that output terminal of said phasing network carrying a signal the phase of which differs from that of the signal at said one input terminal by no more than a predetermined number of degrees after two signals are simultaneously applied to the two input terminals of the phasing network.

7. The memory of claim 6 wherein said predetermined number of degrees is 45°.

8. A phasing network comprising a single circuit including means for both measuring the phase difference between two signals applied thereto and for phase shifting one of said signals by more than one discrete amount to provide at least as many output signals as there are discrete amounts of phase shifting.

9. The phasing network of claim 8 wherein said phase shifting means includes means for phase shifting said one signal by four discrete amounts, such that said phasing network is a two input terminal four output terminal device.

10. A quasi-coherent memory for use in a deceptive jamming system in which an incoming pulse is gated to the memory upon detection and wherein a reset signal is generated upon detection of an incoming signal, comprising:
- a two input terminal, multiple output terminal phasing network for providing at each of its multiple output terminals a signal having an amplitude related to the phase difference between signals at its two input terminals and for providing at its multiple output terminals the signal at one of its input terminals, respectively shifted by multiple different amounts;
- means for coupling said gated input signal to said one input terminal;
- an amplifier;
- means for initially switching one of said output terminals to the input of said amplifier responsive to said reset signal;
- means for coupling the output of said amplifier with a fixed delay to the other of the input terminals of said phasing network;
- means for providing multiple separate d.c. voltages corresponding respectively to the amplitudes of the signals at said multiple output terminals; and
- means responsive to the amplitudes of said d.c. signals for switching to said amplifier that output terminal of said phasing network carrying a signal the phase of which differs from that of the signal at said one input terminal by no more than a predetermined number of degrees after two signals are simultaneously applied to the two input terminals of the phasing network.

* * * * *